A. L. JOHNSON.
METHOD OF CUTTING OVER METAL RIMS.
APPLICATION FILED MAY 17, 1920.
1,423,222.
Patented July 18, 1922.
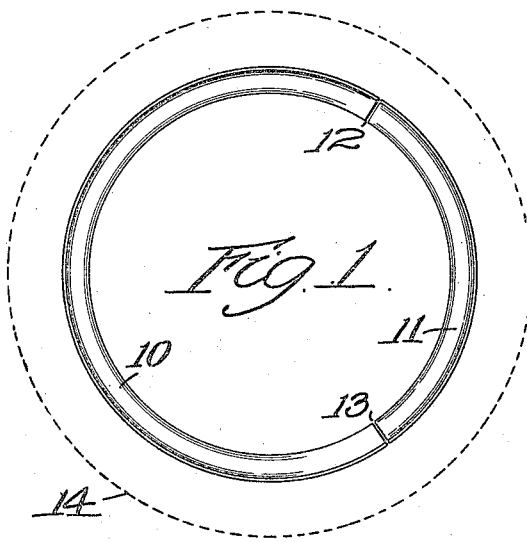
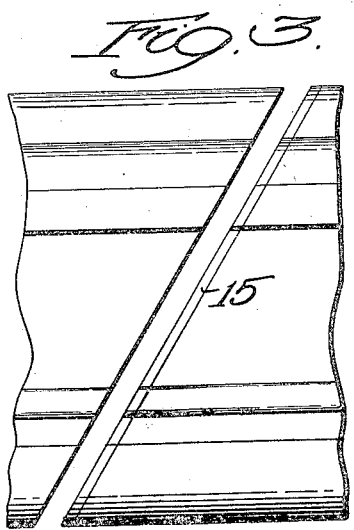
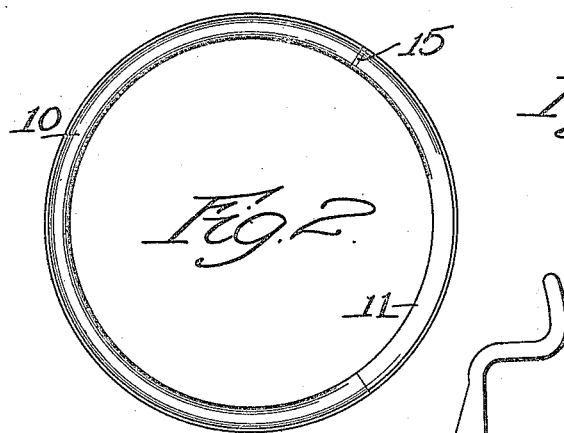
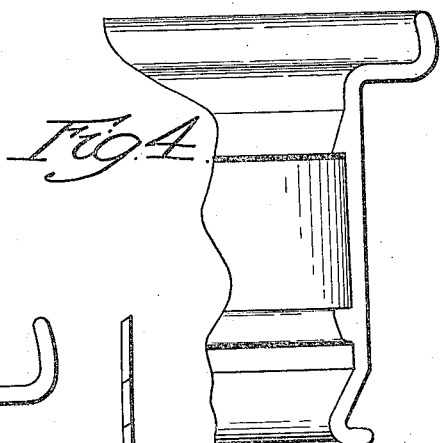
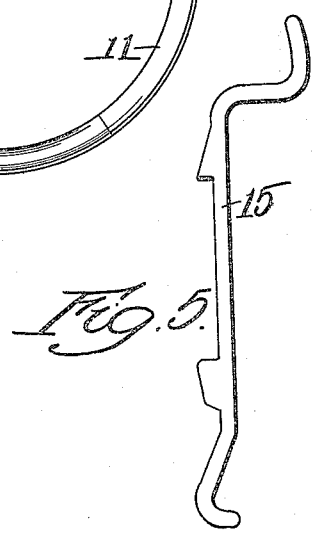
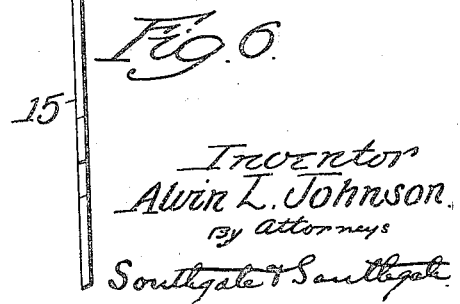
Inventor
Alvin L. Johnson,
By Attorneys
Southgate & Southgate

UNITED STATES PATENT OFFICE.

ALVIN L. JOHNSON, OF WORCESTER, MASSACHUSETTS, ASSIGNOR TO TWO PART RIM CO. INC., A CORPORATION OF DELAWARE.

METHOD OF CUTTING OVER METAL RIMS.

1,423,222. Specification of Letters Patent. Patented July 18, 1922.

Application filed May 17, 1920. Serial No. 382,137.

*To all whom it may concern:*

Be it known that I, ALVIN L. JOHNSON, a citizen of the United States, residing at Worcester, in the county of Worcester and State of Massachusetts, have invented a new and useful Method of Cutting Over Metal Rims, of which the following is a specification.

This invention relates to the cutting over of metal rims for supporting pneumatic tires to render them readily detachable.

The principal objects of the invention are to provide, in a convenient and accurate way, for compensating for the metal taken out in cutting the rims so that when cut over and treated in accordance with this invention the rims will fit the same tire as before without looseness or play; and to provide improvements in the details of the procedure as well as in the cut-over rim itself. Further objects and advantages of the invention will appear hereinafter.

Reference is to be had to the accompanying drawings in which—

Fig. 1 is an edge view of a rim as cut showing approximately the amount of metal that is removed in the cutting operation;

Fig. 2 is a similar view showing how this is compensated for according to this invention;

Fig. 3 is a side view on enlarged scale showing the meeting edges of the two parts of the cut-over rim with this invention applied to it;

Fig. 4 is an elevation of the end of one section thereof;

Fig. 5 is a similar view of the piece of metal that is attached, and

Fig. 6 is an edge view of the same.

In cutting over a solid metal rim so as to produce two sections or even more, at least two cuts have to be made through the rim and these are most conveniently made by a sawing or milling operation. This necessitates the removal of a material quantity of metal at each of the places at which the rim is cut. The amount removed at each place is only a little, namely of a width equal to the thickness of the saw or cutter used. But even when the rim is divided into only two pieces there are two of these places from which the metal has been removed. If the cut edges are placed in abutment against each other the whole rim will be brought out of true, for if one section fits it firmly the other section will move away from its seat in the tire, and will not fit firmly against the inside surface thereof. This also results in getting the rim out of its true circular shape. If the rim is cut into three pieces the evil is added to as will be obvious.

This invention is designed to overcome this difficulty in a very simple manner without the introduction of loose parts.

I have been speaking above of all types of cut over rims, without regard to the manner in which the sections are secured together. In the form shown in the drawings the rim is cut into two parts 10 and 11. This is done by cutting two kerfs 12 and 13 which come between the ends of these sections and these are shown as cut on a slant.

From Fig. 1 it will be clear that in order to form a complete rim the preferred procedure would be to move one section or the other inwardly, thus bringing that section away from its seat in the tire 14. That has been the custom heretofore, and it has resulted in a loose fit which is a dangerous thing in a demountable or detachable rim.

According to this invention I shape a piece of metal of the same material as the rim into a form which corresponds with the cross section of the rim. This piece 15 has a thickness equal to that of the two saw kerfs 12 and 13. This piece of metal is placed on the end of one of the sections 10 or 11 and welded, brazed, or otherwise integrally secured thereto as shown in Figs. 2 and 3. It will be seen therefore that all the thickness taken out by the two saw kerfs is supplied, preferably, at one point, by this piece 15 which is of a suitable thickness for this purpose. By the addition of this thickness to the rim the two sections 10 and 11 can be brought together as shown in Fig. 2 and they will be found to form a complete true circle of the same diameter in both directions and equal to the diameter of the original rim. Therefore this rim fits the old tire just as well as the original rim did and there will be no room for play and looseness.

In those cases in which the rim is split into three parts or more the same principle is carried out. In that case the strip 15 is made of a thickness 50% greater than if the rims were divided into only two sections.

In either event the compensation for the metal removed is provided for preferably, but not necessarily, at one place only and by a single operation. These strips 15 can be punched out readily in a press from sheet metal or they can be made by sawing up an old rim. This constitutes an extremely simple way of overcoming the difficulties that have been met with heretofore in this class of detachable rims, and I have found in practice that it is necessary for the success thereof.

Although I have illustrated and described only one type of rim and consequently only one shape of the strip to be added, I am aware of the fact that the invention can be applied to all types of rims that can be cut into two or more sections. Therefore I do not wish to be limited in this respect but what I do claim is:—

1. The method of cutting over a wheel rim for carrying a pneumatic tire which consists in cutting the rim into a plurality of separate sections and then securing metal thereto filling the space between said sections to compensate for the metal removed in cutting the rim apart.

2. The method of cutting over a wheel rim for carrying a pneumatic tire which consists in cutting the rim into a plurality of separate sections and then inserting a piece all along the end of one of said sections to compensate for the metal removed at all points in cutting the rim apart.

3. The method of cutting over a metal pneumatic tire carrying rim which consists in cutting the rim into sections, then inserting metal between said sections of a thickness sufficient to restore the rim to a substantially circular shape and to its original diameter.

4. The method of cutting over a metal pneumatic tire carrying rim which consists in cutting the rim into two sections, then inserting a piece of metal along the end of one of said sections of a thickness sufficient to restore the rim to a substantially circular shape and to its original diameter so that it will fit the same tire as before it was cut apart.

5. The method of cutting over a metal pneumatic tire carrying rim which consists in sawing the rim into separate sections, thus producing a plurality of saw kerfs across the rim from which the metal is removed, and welding on to the end of one of the sections a piece of metal of the same cross section as the rim and of a thickness equal to the combined width of the several saw kerfs.

6. As an article of manufacture, a wheel rim cut into separate parts and having metal inserted between said parts of the same cross section as the rim and of a thickness equal to the combined thickness of the two bodies of metal removed in cutting the rim apart.

7. As an article of manufacture, a wheel rim cut into two separate parts and having inserted on one end of one of said parts a piece of metal of the same cross section as the rim and of a thickness equal to the combined thickness of the two bodies of metal removed in cutting the rim apart.

8. As an article of manufacture, a metal wheel rim cut into separate sections and having integrally secured on one end of one of said sections a piece of metal to bring the combined circumferential length of the two sections up to that of the original rim.

9. As an article of manufacture, a metal wheel rim cut into separate sections and having integrally welded on the end of one of said sections a piece of metal thick enough to bring the combined circumferential length of the two sections up to that of the original rim, to compensate for the metal removed in cutting the rim apart.

In testimony whereof I have hereunto affixed my signature.

ALVIN L. JOHNSON.